United States Patent [19]

Cautilli et al.

[11] 3,714,097

[45] Jan. 30, 1973

[54] PROCESS FOR PRODUCING LOW FOAMING LATEXES OF INTERPOLYMERS CONTAINING VINYL CHLORIDE AND ETHYLENE

[75] Inventors: Philip A. Cautilli, Feasterville, Pa.; Samuel J. Makower, Wyncote, Pa.

[73] Assignee: Borden Inc., New York, N.Y.

[22] Filed: June 8, 1970

[21] Appl. No.: 44,667

[52] U.S. Cl..................260/29.6 RB, 260/29.6 MQ, 260/87.5 C, 260/897 C 260/897 C
[51] Int. Cl............................C08f 1/13, C08f 15/02
[58] Field of Search....................260/29.6 RB, 29.6 WA, 29.6 MQ, 260/87.1, 87.5 C, 897 C, 878 R

[56] References Cited

UNITED STATES PATENTS

| | | | |
|---|---|---|---|
| 3,019,208 | 1/1962 | Reid et al. | 260/45.5 |
| 3,332,918 | 7/1967 | Benetta et al. | 260/85.5 |
| 3,370,028 | 2/1968 | De Wald | 260/23 |
| 3,468,840 | 9/1969 | Heiberger et al. | 260/41 |
| 3,501,440 | 3/1970 | Kamio et al. | 260/77.5 |
| 3,546,154 | 12/1970 | Hwa et al. | 260/29.6 |
| 3,548,034 | 12/1970 | Cleemann et al. | 260/884 |
| 2,497,291 | 2/1950 | Brubaker | 260/87.5 |
| 3,297,618 | 1/1967 | Glabisch et al. | 260/29.6 |
| 3,383,346 | 5/1968 | Smith | 260/23 |
| 3,423,351 | 1/1969 | Pierce et al. | 260/29.6 |

*Primary Examiner*—William H. Short
*Assistant Examiner*—E. A. Nielsen
*Attorney*—George A. Kap, Edward L. Mandell and George P. Maskas

[57] ABSTRACT

This invention relates to stable vinyl chloride/ethylene interpolymer latexes polymerized at between about 50 and 15,000 psi., which latexes can be removed from said reactors without the usual venting difficulties of foaming, coagulation and valve clogging. The method of making said latexes comprises gradually adding comonomer including a major proportion of vinyl chloride over a period of at least six hours, to an aqueous composition maintained under ethylene pressure and containing a seed latex, a free-radical initiating system and an amount of emulsion stabilizer below that which will cause substantial foaming.

12 Claims, No Drawings

PROCESS FOR PRODUCING LOW FOAMING LATEXES OF INTERPOLYMERS CONTAINING VINYL CHLORIDE AND ETHYLENE

BACKGROUND OF THE INVENTION

Ethylene/vinyl chloride interpolymers in the form of fine particle aqueous dispersions commonly called latexes, have utility as film-forming components of adhesives and of various coatings such as paints and finishes for paper, textiles and the like. Inasmuch as said latexes are made under superatmospheric ethylene pressure it has been extremely difficult to obtain them in stable form because of the danger of gross coagulation occurring during the venting of the polymerization vessel. When polymerization has terminated and the remaining pressurized ethylene is released, the latex becomes permeated with gas bubbles. In latexes made by conventional methods these bubbles form a foam which rises in the gas space and quickly reaches the top of the vessel. Latex particles coagulate in the foam and as the foam and concomitant coagulum pass through the venting valve, clogging is commonplace.

Attempts have been made to prevent valve-clogging by performing the venting operation at an extremely slow rate and intermittently with long waiting periods between ventings, but this cumbersome and uneconomical procedure does not avoid production losses due to coagulation.

Use of anti-foam agents has been tried with only partial success. Agents which inhibit foaming at normal pressures do not perform with equal effect when foams are formed by the release of gases dissolved under high pressure. To obtain even partial decrease of foaming tendency, such agents must be used in amounts so large that they increase rather than decrease coagulation of latex particles, and the anti-foam agents also tend to interfere with other properties of the finished latexes such as the ability to form uniform and clear films.

In searching for means to lessen coagulation during venting, the conventional approach has been to use increased quantities of emulsion stabilizers. Thus, procedures have been disclosed wherein a surfactant is used during polymerization in amount of about 5 percent based on comonomers added, and wherein even more surfactant is then added in amounts totally up to 7–10 percent, to post-stabilize the latex before venting the reactor. This use of increased amounts of surfactant is based on the expectation that the resultant "colloid protection" and mechanical stability should hold also during degassing. However, high amounts of surfactant actually intensify the above-described tendency to foam and therefore in effect frustrate the purpose of avoiding coagulum.

Procedures have also been disclosed wherein termination of reaction is followed by post-addition of polymeric stabilizing agents such as polyvinyl alcohol, but this approach is also unsatisfactory, in that not only is the coagulation not completely prevented but also the additional water that must be added with the polymeric stabilizer results in undesirable dilution of the latex.

SUMMARY OF THE INVENTION

A method has now been found for preparing vinyl chloride/ethylene interpolymer latexes at pressures between about 50 and 15,000 psi which latexes are sufficiently stable to permit rapid venting of the reaction vessel substantially without coagulum and without clogging of the vent valves.

Briefly stated, the method of this invention comprises maintaining ethylene pressure on an aqueous composition containing a seed latex, a free-radical initiating system, and an amount of emulsion stabilizer sufficient to maintain mechanical stability but insufficient to cause substantial foaming and adding gradually to said aqueous composition over a period of not less than six hours, comonomer including vinyl chloride and optionally supplemental comonomers.

Surprisingly, the success of this new method is achieved by a direct reversal of the conventional expedient: when a surfactant is used as the emulsion stabilizer, instead of using increased amounts of surfactant as in the conventional procedure, the amount of surfactant is decreased to less than 0.4 percent based on the weight of charged comonomer.

After venting of the reactor has taken place, latexes of this invention can be used without further formulation as a coating on paper or textile fabric, particularly in such applications where the low-foaming characteristic is an asset. Latexes of the instant invention can also be further modified by post-addition of agents to obtain various combinations of properties.

Since the instant latexes do not contain conventional amounts of surfactants, they have the special advantage of compatibility with a wider range of post-additives. Emulsion stabilizers can be added to a latex of this invention for purposes such as to extend the storage life of the latex, in quantities which would be objectionable if conventional amounts of surfactants were already present. Once the ethylene pressure on the latex has been released, even foaming agents can be added, as when it is desired to impart high-foaming characteristics.

DETAILED DESCRIPTION

In the method of this invention ethylene is maintained at a superatmospheric pressure over an aqueous composition in which copolymerization takes place during gradual addition of comonomers comprising a major portion of vinyl chloride and optionally supplemental comonomers. Thus, the comonomer can be solely vinyl chloride or it can be vinyl chloride together with one or more different ethylenically (i.e., olefinically) unsaturated monomers.

The two-fold essence of the method of this invention is (1) the use of a seed latex in said aqueous composition and (2) the restriction of any emulsion stabilizer present in said aqueous composition to an amount sufficient to maintain mechanical stability of the latex but below the amount that which will cause substantial foaming when the pressure of ethylene on the latex is released.

The seed latex can be made by free-radical initiated copolymerization of a variety of ethylenically unsaturated comonomers as described in detail further below. The size of the seed particles can be in the range of between about 0.005 and 0.10 microns. The seed latex can be used in an amount such that the seed solids are between about 0.01 percent and 10 percent of the total comonomer added. The seed latex can be prepared beforehand in a separate vessel and a desired aliquot can then be introduced into the aqueous composition of this invention. Alternatively, the seed latex can be made in situ in all or part of said aqueous composition before the reactor is pressurized with ethylene.

The emulsion stabilizers used in this invention can be any substance capable of maintaining a latex dispersed in the form of latex particles and preventing said particles from coagulating under mechanical stress such as obtained during the stirring of a latex. Anionic or nonionic surfactants are the preferred emulsion stabilizers and will be used herein to illustrate the invention. The emulsion stabilizer can also be a polymeric colloid stabilizer of the type often called "colloid protective agent." Examples of the various types of emulsion stabilizers are given further below.

The restriction as to emulsion stabilizer consists in maintaining the quantity of said stabilizer between two thresholds. If the quantity of stabilizer is below the lower threshold the latex becomes unstable during polymerization and tends to coagulate even before venting. If the quantity of stabilizer is above the upper threshold, the aforementioned difficulties in venting are experienced. The exact locations of the two thresholds for any particular stabilizer depends on a number of factors including the compositions of both seed latex and product latex, as well as the quantity and particle size of seed latex used. In the case of the preferred anionic or nonionic surfactants, the inventors find it suitable to restrict the amount of such surfactants to not more than about 0.4 percent, preferably not more than about 0.2 percent, based on the weight of comonomers added. As to the lowest amount of surfactant permissible, this can be about 0.005 percent, or in cases where the seed has been prepared with an excess of persulfate or peroxydiphosphate initiator (such as greater than about 2 percent based on seed latex solids) or where the seed is prepared with highly hydrophilic monomers, the surfactant can be omitted entirely.

Both the seed latex and the restriction as to amount of emulsion stabilizer are necessary in carrying out the method of the present invention. Without the seed latex, it is not possible to obtain a stable finished latex with the low amounts of emulsion stabilizer used in this method. Without restricting the amount of emulsion stabilizer, even when a seed latex is used, the advantages of the method of this invention are not obtained.

The seed latex used in this invention can be prepared by the emulsion polymerization of any thus polymerizable ethylenically unsaturated compound. Illustratively, the polymer of the seed latex can be a homopolymer or interpolymer of a monomer or monomers such as vinyl chloride; vinyl acetate; vinyl propionate; alkyl acrylates or methacrylates having from one to 10 carbon atoms in the alkyl group, e.g., methyl acrylate, ethyl acrylate, methyl methacrylate, butyl methacrylate, isopropyl acrylate, 2-ethyl hexyl acrylate, decyl methacrylate, and the like. Exemplarily, the polymer of the seed latex can be polyvinyl chloride; poly (methyl methacrylate); polyvinyl acetate; poly (2-ethyl hexyl acrylate); polyethylene; a copolymer of vinyl chloride and a minor amount of ethylene; a copolymer of vinyl chloride with 99 to 1 percent of one of the other ethylenically unsaturated compounds, e.g., ethyl acrylate; various interpolymers of copolymerizable ethylenically unsaturated compounds, and the like.

In preparation of the seed latex the initiators, buffers and emulsion stabilizers can be selected from the same respective substances described further below as being appropriate in making the product latex of this invention. In regard to the emulsion stabilizer used in making the seed latex, the amount must be sufficiently low so that the proportion present in the aliquot subsequently added to the aqueous phase in preparation of the vinyl chloride/ethylene latex of this invention does not bring the total amount of emulsion stabilizer in the product latex to an amount which causes substantial foaming. Thus when an anionic or nonionic surfactant is used as the emulsion stabilizer, the amount used in making the seed latex is such that the amount in the aliquot of seed latex to be used plus any further amount to be directly added to the aqueous phase in making the product latex of this invention does not exceed about 0.4 percent based on comonomers added.

As stated above, the particle size of the seed latex can be between about 0.005 and 0.10 microns. The inventors have found that seeds with average particle size between about 0.01 and 0.05 microns are particularly suitable.

As to the emulsion stabilizer, this can be introduced into the aqueous composition as part of the polymer seed latex, or it can be added directly to the aqueous composition, or its total amount can be divided between these two types of addition. The emulsion stabilizer can be a single molecular type or it can be a mixture of several types of emulsion stabilizers.

When the preferred anionic or nonionic surfactants are used as emulsion stabilizer, these can, for example, be sodium lauryl sulfate, sodium dodecyl benzene sulfonate, sodium alkyl sulfosuccinate, alkyl esters of sodium sulfosuccinate, sodium or ammonium salts of sulfate esters of alkyl phenoxy poly (ethyleneoxy) ethanols such as octyl or nonylphenoxy poly (ethyleneoxy) ethanols, including the full range of ethylene oxide contents available. The aqueous composition can also contain condensates of ethylene oxide with hydrophobic bases formed by condensing propylene oxide with propylene glycol.

The choice of surfactant level can depend on the particular balance of latex properties desired. The lower the amount of surfactant, the more effective is the avoidance of foaming in the depressurized reactor, but also the less permanent is the mechanical stability of the latex and the sooner after depressurization is it desirable to add additional stabilizing agents. As a compromise between the two advantages, the inventors prefer having the surfactant concentration within the range of about 0.005 and 0.15 percent.

As mentioned above, prior procedures not only use up to more than 5 percent surfactant during polymerization but also add supplemental amounts bringing the total surfactant up to about 10 percent first before venting for the purpose of alleviating the venting problems. On the basis of past practice, it is therefore completely unexpected to have success by using only extremely small amounts of surfactants according to the instant invention.

When the emulsion stabilizer of this invention is a polymeric colloid material, it can be, for example, starch, gelatin, casein, hydroxyethyl cellulose, carboxymethyl cellulose, polyvinyl alcohol of both fully hydrolyzed and partially hydrolyzed grades, polyvinyl pyrrolidone and the like.

The aqueous composition of this invention can contain as a buffer any water-soluble compound capable of maintaining the pH between about 6 and about 12, preferably between about 8 and about 10. Examples of such compounds include alkali metal salts of carbonic acid, phosphoric acid, citric acid, and tartaric acid, as well as weak bases like ammonia or alkyl-substituted ammonia. Thus there can be used sodium carbonate, sodium bicarbonate, ammonium carbonate, trisodium phosphate, sodium dihydrogen phosphate, disodium hydrogen phosphate, sodium citrate, sodium tartrate, potassium carbonate, potassium hydrogen phosphate, potassium tartrate, ammonium hydroxide or methylammonium hydroxide.

The free-radical donating initiator of this invention can be selected from any of the initiators for aqueous emulsion polymerization known in the art including those which undergo scission under the influence of heat and those which are caused to form free-radicals by reaction with reducing agents. Water-soluble type initiators are usually to be preferred including potassium persulfate, sodium persulfate, ammonium persulfate, potassium peroxydiphosphate, hydrogen peroxide and others which will be known to those skilled in the art. When reducing agents are used it is again preferred to use materials which are water-soluble such as sodium formaldehyde sulfoxylate, sodium metabisulfite, sodium hydrosulfite and ascorbic acid.

The initiator, and the redox agent if used, can be supplied to the aqueous composition in various ways. For example, the entire amount of initiator used can be added at the start of reaction, or an initial portion can be followed by gradual or portionwise addition of the remainder during the course of reaction, or the entire amount can be added gradually as an aqueous solution throughout the reaction period. The amounts to be used will depend upon the rate of polymerization desired. Preferably, the aqueous composition contains between about 0.1 percent and 5 percent. If a reducing agent is used, it also is used in amount totalling between about 0.1 percent and 5 percent.

The method of this invention can be carried out at any suitable ethylene pressure in the range from about 50 psi to about 15,000 psi and at temperatures in the range from about 15°C. to about 85°C. Choice of conditions will depend chiefly upon the amount of ethylene which is desired in the interpolymer and upon the nature of the initiating system employed. Thus redox initiating systems are commonly used at temperatures below about 50°C. and pressures above about 3,000 psi. The use of thermally activated systems permits the use of temperatures above 50°C. The present inventors have found that when a thermally activated initiator is used, temperatures between about 50°C. and 85°C. and pressures between about 500 and 3,000 psi are suitable for the purpose of introducing from about 6 percent to 30 percent ethylene into the vinyl chloride interpolymer.

The inventors have also found that the use of persulfate or peroxydiphosphate initiators with the last mentioned ranges of temperature and pressure lead to ethylene interpolymers with greatly enhanced resistance to discoloration on storage or on exposure to heat. The method of this invention will therefore be illustrated chiefly as a means of obtaining latexes of such discoloration-resistant polymers.

More specifically, the invention will be illustrated as a means of copolymerizing vinyl chloride and ethylene. However, up to 49% of the vinyl chloride can be replaced by supplemental olefinically unsaturated coreactive comonomers. Suitably between about 15 percent and 25 percent of the vinyl chloride is thus replaced. Examples of such comonomers include vinyl esters such as vinyl acetate and vinyl propionate; olefins such as propylene, butene and the like; vinylidene chloride; and esters of acrylic or methacrylic acid with alkanols containing up to ten carbon atoms in the alkyl group. Illustrative of such esters are methyl acrylate, methyl methacrylate, ethyl acrylate, butyl acrylate, isopropyl methacrylate, 2-ethylhexyl acrylate, decyl acrylate, and the like.

In addition, a functional comonomer can be included in small amounts, up to about 10 percent of the total interpolymer, and preferably up to about 4 percent. Illustrative of such functional comonomers are the vinyl esters of polybasic acids such as divinyl adipate, divinyl succinate, and divinyl itaconate; allyl esters of polyfunctional acids such as diallyl fumarate, triallyl cyanurate, and diallyl vinyl citrate; unsaturated ethers such as divinyl ether and diallyl ether; and compounds such as glycidyl acrylate, glycidyl methacrylate, glycidyl vinyl ether, and glycidyl allyl ether.

A condition of the method of this invention is that the addition of the comonomers is extended over a period of at least 6 hours. Up to about one-fifth of said comonomers can be added at the beginning of a polymerization run. The remainder of the monomers is then added over the extended period of time, making such adjustments in relative addition rates to compensate for inequalities in reactivity ratios by procedures known to those familiar with the art of such interpolymerization.

For example, when vinyl chloride is the sole comonomer with ethylene, up to about one-fifth of the total amount of vinyl chloride charged to the reactor can be added in one initial portion. The remainder is then added gradually over the extended period of time. If the vinyl chloride is added at too rapid a rate, there is a tendency for the ratio of ethylene incorporated in the copolymer to be diminished. On the other hand, prolonged addition times are impractical. It is preferred to limit the vinyl chloride addition time to between about 10 and 18 hours, more preferably between about 12 and 16 hours. It is also preferred to maintain the ethylene pressure and the temperature substantially constant during the period of adding vinyl chloride so as to ensure a substantially constant ethylene content in the polymer formed at successive stages of the run.

The method of this invention can be used to make stable latexes of high solids content. Thus, in the case of vinyl chloride/ethylene copolymers, sufficient vinyl chloride can be added to reach a polymerized solids content of at least 40% solids with extremely good mechanical stability, the product latexes remaining stable on storage for periods in excess of one year. Illustratively such latexes can have a solids content of from 47 percent up to 66 percent or more. This is in marked contrast to the results obtained with methods of the prior art which are extremely difficult to control at high solids.

In the making of these high-solids latexes, the present method has a further advantage over the prior art in that the charged comonomer comprising vinyl chloride need not be more than about 10 percent to 12 percent in excess over the comonomer to be copolymerized. At the end point of the reaction when the desired high-solids is attained, 85 percent or more of the charged comonomer can be reacted. Obviously, however, in applying the method of this invention, a latex of lower solids can be made, if desired, either by early termination of the comonomer addition or by early termination of the reaction or both.

This invention will be further illustrated by description in connection with the following specific examples of the practice of it, wherein, as also elsewhere herein, proportions are in parts by weight unless stated otherwise, and wherein the values reported for the ethylene content of the resultant copolymers or interpolymers were obtained by direct quantitative elemental analysis. Unless stated otherwise, statements in this specification as to amounts added to the aqueous composition are expressed in percentage based upon the total weight of added (charged) comonomer comprising vinyl chloride.

EXAMPLE 1

This example illustrates the preparation of a seed latex of polyvinyl chloride.

Using a pressure kettle equipped with stirrer and means for introducing reactants, 60.6 grams of sodium lauryl sulfate where dispersed in 11,550 grams of deionized water. There was then added 6,060 grams of vinyl chloride monomer and 24.2 grams sodium persulfate. Polymerization was carried out at 40° to 60°C. accelerated by the gradual addition of 100 ml. of 5 percent aqueous sodium formaldehyde sulfoxylate. The resultant seed latex had a solids content of 34.6 percent and was post-stabilized by the addition of 60.6 grams of sodium lauryl sulfate. Average particle size of the seed latex was 0.035 microns.

EXAMPLE 2

This example illustrates the preparation of a seed latex of polyvinyl acetate.

Using a vessel equipped with stirrer, reflux condenser and means for introducing reactant, 17 parts by weight of a 35 percent aqueous solution of sodium lauryl sulfate were dispersed in 84 parts of deionized water. There was then added 25 parts of vinyl acetate monomer, 0.40 parts of potassium persulfate and 2.0 parts of a 2 percent aqueous solution of sodium bisulfite. After adjustment of pH to 5.0 with dilute sodium hydroxide, the aqueous composition was heated. When the temperature reached 55°C., 75 parts of vinyl acetate monomer and 18 parts of a 2 percent aqueous solution of sodium bisulfite were added gradually over a period of one hour, during which the temperature was about 62°C. After the additions were complete, the composition was heated to 72°C. and kept at 72°C. for additional hour, yielding a seed latex having 55 percent solids with a particle size ranging between 0.02 and 0.05 microns.

EXAMPLE 3

This example illustrates the preparation of a seed latex of 2-ethylhexylacrylate.

Using a reactor as in Example 1, a 140 gram portion of a 25 percent aqueous solution of sodium lauryl sulfate was dispersed in 4,200 ml. of distilled water. There was then added a solution of 46.5 grams ammonium persulfate in 500 ml. water.

A monomer emulsion was prepared by dispersing 3,500 grams of 2-ethylacrylate in a solution of 70 grams 25 percent aqueous sodium lauryl sulfate in 1,000 ml of water.

The reactor composition was heated to 80°C. and held at that temperature while the monomer emulsion was added over a period of one hour. Tests on the latex obtained showed that conversion of monomer to polymer was substantially complete, the latex had a solids content equal to 37 percent and a surface tension of 56 dyne/cms. Particle size was between 0.03 and 0.06 microns.

EXAMPLE 4

A vessel containing 4,825 grams of deionized water was charged with 70 grams of potassium persulfate, 30 grams of disodium phosphate and 162 grams of the seed latex of Example 3. The dispersion was heated to 70°C. and charged with ethylene until the pressure reached 1,500 psi. While ethylene pressure was maintained at 1,500 psi, 5,000 grams of vinyl chloride monomer was continuously fed to the vessel over an 8 hour period. Polymerization at 70°C. was continued for 3 hours longer. The product was cooled to room temperature. Venting was achieved in 20 minutes with no valve clogging. Product was a stable coagulum-free latex containing 43.4 percent solids and having a surface tension of 57.1 dynes/cm. The ethylene content of the polymer was 20 percent and minimum film-formation temperature was 18°C.

EXAMPLE 5

The procedure of Example 4 is repeated except that the seed latex is omitted and in its place 32 grams of sodium lauryl sulfate is added to the deionized water. A solution of 5 percent aqueous sodium formaldehyde sulfoxylate is used to promote reaction. A latex is obtained which causes much difficulty on venting. There is so much coagulation that the actual solids before venting cannot be estimated. This is not an example of the instant invention, the seed latex being omitted.

EXAMPLE 6

An autoclave containing 3,000 grams of water, 20 grams of sodium carbonate, 35 grams of sodium persulfate, 175 grams of a seed latex made as in Example 3 and 1,200 grams of vinyl chloride monomer was heated to 60°C. while under 1,200 psi ethylene.

At 60°C. two continuous feeds were charged simultaneously over a 13 hour period. Feed 1 consisted of 5,000 grams of vinyl chloride monomer and Feed 2 was ethylene gas added as required to maintain constant pressure.

Venting of the autoclave to atmospheric pressure was achieved without difficulty in about 20 minutes.

A stable, coagulum-free latex was obtained. Total solids was 63.0 percent, the surface tension was 56.0 and the latex had a pH of 7.6. The latex was capable of forming films at 19°C. Such films coated on wood and paper were clear, nonblocking, flexible and resistant to spotting by both water and grease.

EXAMPLE 7

The procedure of Example 6 was repeated except that 160 grams of sodium lauryl sulfate was added to the water before heating and charging with monomers. This is not an example of the instant invention, inasmuch as it used surfactant in excess of 0.4 percent, and resulted in a latex which had such high foaming characteristics that venting was troublesome. Even after additions of an anti-foaming agent, the vent valves became clogged so as to hamper depressurization severely. The bulk of the product, having undergone severe shear on leaving the kettle during the venting operation had excessive coagulum and low solids.

EXAMPLE 8

The procedure of Example 4 was followed except that the ethylene pressure was 900 psi. Venting was achieved in 20 minutes with no valve clogging. Product was a stable coagulum-free latex containing 46.4 percent solids, having a minimum film formation temperature of 34°C. Ethylene content of the polymer was 12 percent.

When the procedure of this example is repeated except that the seed latex is omitted and replaced by 32 grams of sodium lauryl sulfate, a latex is obtained containing an excessive amount of coagulated polymer.

Likewise, when the procedure was repeated with an additional 160 grams of sodium lauryl sulfate, troublesome high-foaming characteristics developed. Thus it is demonstrated that both the seed latex and the restriction of the amount of surfactant are required to obtain the benefits of the instant invention.

EXAMPLE 9

An autoclave containing 6,500 grams of water, 175 grams of a seed latex made in Example 3, 20 grams of sodium bicarbonate, 15 grams of sodium persulfate was heated to 80°C. While under 1,200 psi ethylene. Two simultaneous feeds were begun and continued for 17 hours. Feed 1 consisted of a mixture of 3,600 grams vinyl chloride and 2,400 grams vinyl acetate. Feed 2 was a solution of 24 grams of sodium bicarbonate and 43 grams of sodium persulfate in 2,150 grams of water. Ethylene pressure was maintained at 1,200 psi and temperatures at 80°C. throughout the run.

The reactor was subsequently cooled and venting was achieved without difficulty over a 20 minute period.

The resultant latex was coagulum-free and found to contain 41.4 percent solids. The surface tension was 51.4 dynes/cm. The latex formed a film at 10°C. which was clear, flexible, non-blocking and resistant to water spotting.

EXAMPLE 10

The procedure of Example 8 was followed excepting that monomer addition was extended over a period of 18 hours and reaction at 63°C. continued for 3 more hours. The reactor was easily vented in 20 minutes. A stable latex containing 55.2 percent solids was obtained. The polymer of this latex contained 12 percent ethylene and was resistant to yellowing on storage, and on heating at 150°C.

EXAMPLE 11

A series of sixteen polymerization runs is made in which the procedure of Example 6 is followed except that the type and amount of seed latex is varied. The four types of seed latex are (a) 60 parts vinyl chloride/40 parts vinyl acetate (b) 80 parts vinyl chloride/20 parts methyl acrylate (c) 80 parts vinyl chloride/20 parts isopropyl acrylate (d) 83 parts vinyl chloride/17 parts ethylene. For each of these seed latexes, four separate runs are made with the amount of seed solids being respectively 0.1 percent, 2 percent, 3 percent, and 5 percent based on the 6,000 grams vinyl chloride added. In each of the 16 cases, benefits of the instant invention are obtained in facilitation of the venting of the reaction vessel.

EXAMPLE 12

A run is made following the procedure of Example 6 except that the temperature of reaction is 15°C., the pressure of ethylene is 15,000 psi, 50 ml of a 0.1 molar solution of chelated iron, 50 ml of a 10 percent aqueous solution of sodium hydrosulfite are charged to start reaction. A 5 percent aqueous solution of sodium formaldehyde sulfoxylate is also added gradually over the 13 hour addition period. A stable latex is obtained which permitted easy venting of the reactor without clogging of valves.

It will be understood that it is intended to cover all changes and modifications of the examples of the invention herein chosen for the purpose of illustration which do not constitute departures from the spirit and scope of the invention.

What is claimed is:

1. In the emulsion-polymerization at superatmospheric pressure of an interpolymer comprising vinyl chloride and ethylene, an improvement which provides a stable latex product that remains mechanically stable during and after release of said pressure, said improvement comprising the sequential steps of
    a. maintaining ethylene pressure at a level between about 50 and 15,000 psi on an aqueous composition containing
        i. a seed latex made by free-radical initiated emulsion copolymerization of ethylenically unsaturated monomers,
        ii. an anionic surfactant in amount at least 0.005 percent and not exceeding 0.4 percent based on weight of comonomer charged, and
        iii. a free-radical initiator system maintained at a level sufficient to effect emulsion polymerization while
    b. adding gradually, over a period of not less than six hours, a comonomer charge including a major proportion of vinyl chloride.

2. The improvement of claim 1 wherein the surfactant is selected from the group consisting of sodium lauryl sulfate and sodium dodecyl benzene sulfonate.

3. The improvement of claim 1 wherein the seed latex has a particle size between about 0.005 and 0.10 microns and is present in an amount between about 0.01 percent and 10 percent solids based on the total amount of said comonomer charge.

4. The improvement of claim 1 wherein all the comonomer is vinyl chloride.

5. The improvement of claim 1 wherein the minor proportion of comonomer is selected from the group consisting of vinyl acetate, vinyl propionate, vinylidene chloride, propylene, butene, and esters of acrylic or methacrylic acid with alkanols containing up to ten carbon atoms in the alkyl group.

6. The improvement of claim 1 wherein the temperature of interpolymerization is between about 15°C and 85°C.

7. The improvement of claim 1 wherein the pressure is maintained at a level between about 500 and 3,000 psi, the temperature of interpolymerization is between about 50°C and 85°C, and the initiator system is a water-soluble alkali metal persulfate or peroxydiphosphate.

8. An emulsion polymerization method of preparing a stable latex of a copolymer containing between about 70–94 percent of vinyl chloride and correspondingly 30–6 percent ethylene, said method comprising
   a. maintaining ethylene pressure at between about 500 and 3,000 psi on an aqueous composition at a temperature between about 50°C and 85°C, said aqueous composition containing a seed latex, an anionic surfactant in amount at least 0.005 percent and not exceeding 0.4 percent based on weight of the vinyl chloride added, and an initiator selected from the group consisting of water-soluble persulfates and peroxydiphosphates, said initiator being maintained at a level sufficient to effect polymerization while
   b. adding vinyl chloride monomer gradually over a period of not less than about 6 hours.

9. A method of preparing by emulsion polymerization a stable latex of a terpolymer of vinyl chloride, vinyl acetate and ethylene which comprises maintaining ethylene pressure at between about 500 psi and 3,000 psi on an aqueous composition at a temperature between about 50°C and 85°C, said aqueous composition containing a seed latex and an anionic surfactant in an amount between about 0.005 percent and about 0.4 percent based on total weight of vinyl chloride and vinyl acetate added; adding gradually thereto over a period of between about 6 and 24 hours an aqueous solution of a water-soluble alkali metal persulfate or peroxydiphosphate to effect polymerization while simultaneously adding over the same period both vinyl chloride and vinyl acetate in the weight proportions between about 51/49 and 99/1.

10. A method of preparing by emulsion polymerization a latex containing between about 40 percent and 66 percent solids of a vinyl chloride/ethylene copolymer comprising about 17–20 percent by weight ethylene, said method comprising the steps of
   a. maintaining substantially constant ethylene pressure at between about 1,200 and 1,500 psi on an aqueous composition at a temperature of between about 55°C and 70°C, said composition comprising between about 0.5 percent and 3.0 percent of a polyvinyl chloride or poly (2-ethyl hexyl acrylate) seed latex and between about 0.005% and about 0.4 percent of an anionic surfactant,
   b. adding gradually thereto at a substantially constant rate, over a period of between about 12–16 hours, an aqueous solution of a persulfate or peroxydiphosphate initiator, in an amount between about 0.2 percent and 2 percent based on weight of the aqueous composition, to effect polymerization while
   c. simultaneously adding gradually over the same period an amount of vinyl chloride in about 5–20 percent excess over the theoretical amount needed to obtain the expected solids and
   d. maintaining the polymerizing system at 55°–70°C until the required solids is obtained.

11. A stable latex having a solids content of between about 40 percent and 66 percent, of a vinyl chloride/ethylene copolymer containing about 17–20 percent ethylene, made by an emulsion polymerization method comprising the steps of
   a. maintaining substantially constant ethylene pressure at between about 1,200 and 1,500 psi of an aqueous composition at a temperature of about 55°–70C, said composition containing between about 0.5 percent and 3.0 percent of a poly (2-ethyl hexyl acrylate) seed latex and at least about 0.005 percent and not more than about 0.4 percent of an anionic surfactant,
   b. adding gradually thereto at a substantially constant rate, over a period of between about 12–16 hours, an aqueous solution of a water-soluble alkali metal persulfate or peroxydiphosphate, in an amount to effect polymerization while
   c simultaneously adding gradually over the same period an amount of vinyl chloride in about 5–20 percent excess over the theoretical amount needed to obtain the expected solids, and
   d. maintaining the polymerizing system at 55°–70°C until required solids is obtained.

12. A low-foaming latex of a vinyl chloride/ethylene interpolymer, said latex being made by a method using the improvement of claim 1 having a solids content between about 40 percent and 66, percent and being sufficiently stable to permit rapid venting of the reaction vessel substantially without coagulum and without clogging of the vent valves.

* * * * *